April 21, 1931. N. SKILLMAN 1,801,615
UNIVERSAL PIVOTAL SPRING SHACKLE
Filed April 26, 1926
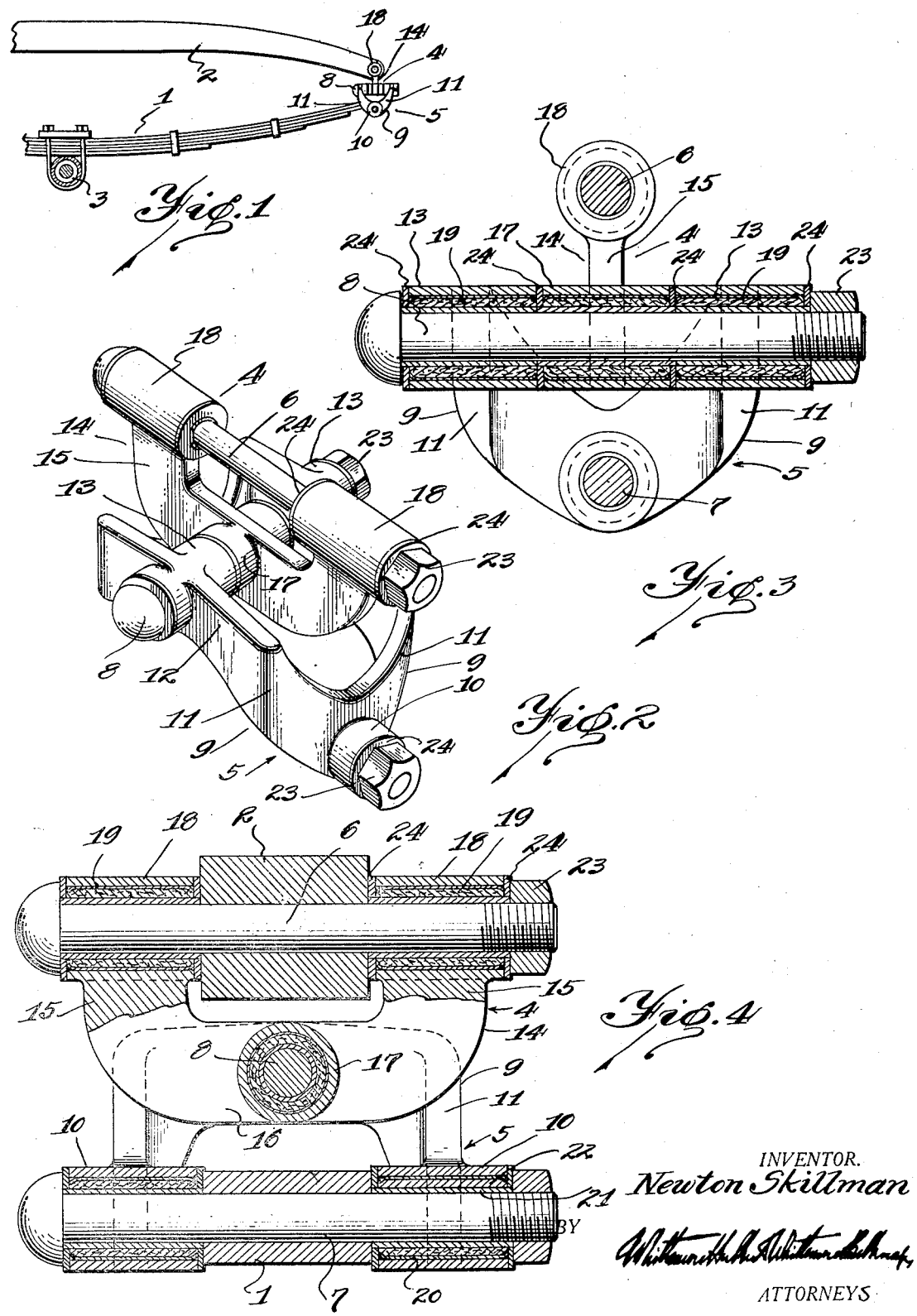
INVENTOR.
Newton Skillman
ATTORNEYS Patented Apr. 21, 1931

1,801,615

UNITED STATES PATENT OFFICE

NEWTON SKILLMAN, OF HIGHLAND PARK, MICHIGAN, ASSIGNOR TO O. & S. BEARING CO., OF DETROIT, MICHIGAN, A CORPORATION OF MICHIGAN

UNIVERSAL PIVOTAL SPRING SHACKLE

Application filed April 26, 1926. Serial No. 104,734.

The invention relates to vehicle spring shackles and has for one of its objects the provision of a universal shackle for connecting a spring to a member such as a vehicle frame. Another object is to provide a spring shackle of this nature which is so constructed that there is no metal to metal contact between the relatively movable parts. A further object is to provide a spring shackle in which the relatively movable parts are self-lubricated and function to oppose free relative movement, thereby operating in effect as a shock absorber.

With these as well as other objects in view, the invention resides in the novel features of construction as more fully hereinafter set forth.

In the drawings:—

Figure 1 is a side elevation of a portion of a motor vehicle having applied thereto a spring shackle embodying my invention;

Figure 2 is a perspective view of the spring shackle;

Figures 3 and 4 are transverse cross sections through the spring shackle.

In assembling the spring suspension of a motor vehicle the spring is usually first rigidly secured to the vehicle axle and then pivotally secured to the vehicle frame. It often happens that the springs have become twisted and that as a consequence it is necessary to place these springs under stress by twisting the same in the opposite direction in order to connect the spring to the vehicle frame by the spring shackles, as heretofore used. As a consequence, the spring is under a torsional stress and in addition to improperly functioning, it tends to cause the parts of the shackle to wear unevenly.
With my invention, I provide a shackle which takes care of the twisting of the spring and allows the spring to remain in its natural condition, as far as torsion is concerned, so that the spring is free to function properly.
In detail, 1 is the spring, 2 the frame and 3 the axle of a motor vehicle, the driving power for advancing the motor vehicle being applied by means of a suitable connection between the frame and axle instead of depending upon the spring.

For connecting the rear end of the spring to the frame, I have provided a universal shackle, which comprises the upper and lower shackle sections 4 and 5, respectively, which in turn are connected to the frame and spring by the substantially parallel bolts 6 and 7, respectively. The bolt 6 extends through the frame and the upper section while the bolt 7 extends through the spring eye and the lower section. These two shackle sections are pivotally connected to each other by the bolt 8 which extends therethrough transversely of the bolts 6 and 7. The lower section 5 is formed of the integral diverging yokes 9 which extend upwardly and outwardly away from the axially aligned bossed 10. Each yoke has the arms 11 and the base 12 extending between the upper ends of these arms and each base 12 has provided centrally thereof the transverse boss 13 which is axially aligned with the boss upon the other base. The upper section 4 is formed of the yoke 14 having the arms 15 and the base 16 connecting the lower ends of said arms.

This yoke extends downwardly between the bifurcations of the lower shackle section formed by the diverging yokes 9 and its base is provided with the transverse boss 17 located centrally thereof and adapted to be axially aligned with the bosses 13 for the passage of the bolt 8. The upper ends of the arms 15 are provided with the axially aligned bosses 18. The bosses 10 of the lower shackle section are adapted for the passage of the bolt 7 which extends through the spring eye while the bosses 18 of the upper shackle section are adapted for the passage of the bolt 6 which extends through the frame.

With the construction as thus far described, it will be seen that if the vehicle spring is twisted and consequently its eye would not be exactly parallel to the bolt for connecting the shackle to the frame, the lower section can be rotated relative to the upper section of the spring shackle and the spring then connected to the lower section without being twisted. As a consequence, the placing of the spring under torsional stress is avoided and the spring is free to assume its normal functions.

For the purpose of avoiding metal contact between the relatively movable parts, and also for the purpose of making the relatively movable parts self-lubricated, I have provided the bearings 19 which are located in the bosses 10, 13, 17 and 18. Each of these bearings comprises an outer section 20 which is non-rotatably secured within a boss as by being driven thereinto, an inner section 21 which is non-rotatably secured to the member to be pivotally connected and the bushing 22 which is located between the sections and is preferably rotatable about the inner section with the outer section. This bushing is formed of a compressed fibrous material such as reinforced asbestos which has been impregnated with lubricant.

The inner sections 21 of the bearings surrounding the bolts 6, 7 and 8 extend beyond the ends of the bosses 18, 13 and 10, respectively, and their inner ends are non-rotatably engageable with the frame 2, boss 17 of the upper shackle section 4 and the spring, respectively. The inner ends of these inner bearing sections are forced inwardly by the nuts 23 which are threaded upon the bolts 6, 7 and 8 and, as shown, directly contact with the outer ends of these bearing sections. For holding the parts from metal to metal contact, I have provided the washers 24 preferably formed of fibre and surrounding the inner sections of the bearings at both their inner and outer ends and located at the ends of the bosses in which these bearings are located, these washers acting as spacers so that the adjacent metal parts cannot contact.

From the above description it will be readily seen that I have provided a shackle which provides for connecting a warped or twisted spring to the frame of a motor vehicle without placing this spring under torsional stress. It will also be seen that I have provided a shackle which is self-lubricated and in which relative movement of the parts is resisted by reason of the compressed fibrous bushings opposing resistance to rotation relative to the inner sections of the bearings. Furthermore, it will be seen that metal to metal contact between the parts is prevented.

What I claim as my invention is:

1. The combination with a vehicle spring and member to which said spring is movably connected, of a shackle comprising sections, a bolt extending through said sections, bearings carried by one of said sections and surrounding said bolt, each comprising relatively rotatable sections, one bearing section being non-rotatably secured to one shackle section and the other bearing section being non-rotatably secured to the other shackle section, substantially parallel bolts extending transversely of said first-mentioned bolt through said shackle sections and spring and member and bearings surrounding said last-mentioned bolts, each comprising relatively rotatable sections, one section of each of said last-mentioned bearings being non-rotatably secured to said shackle sections and the other section of each of said last-mentioned bearings being non-rotatably secured to the spring and member.

2. The combination with a vehicle spring and member to which said spring is movably connected, of a shackle connecting said spring and member and including cooperating shackle sections, one shackle section being formed of integral diverging yokes, the other of said shackle sections being formed of a single yoke, means for pivotally securing said yokes to each other and means for pivotally securing one of said yokes to said spring and the other of said yokes to said member.

3. The combination with a vehicle spring and member to which said spring is movably connected, of a shackle connecting said spring and member and comprising cooperating shackle sections, one shackle section being formed of integral diverging yokes and having axially aligned bosses adjacent to the points of connection of said yokes and axially aligned bossed extending transversely of said first-mentioned bosses upon the bases of said yokes, the other of said shackle sections being formed of a yoke having a boss upon its base adapted to be aligned with said last-mentioned bosses and axially aligned bosses at its ends, a bolt extending through said first-mentioned bosses for connecting the bifurcated shackle section to said spring, a bolt extending through the bosses upon the bases of said yokes for connecting said shackle sections to each other and a bolt extending through the last-mentioned bosses for connecting said last-mentioned shackle section to said member.

4. In a shackle of the class described, a pair of cooperating shackle sections, one section being formed of diverging yokes having axially aligned bosses positioned intermediate the ends of said yokes, the other of said sections being formed of a single yoke having a boss upon its base adapted to be aligned with the aforesaid bosses, and a bolt extending through said bosses for pivotally connecting said shackle sections together.

In testimony whereof I affix my signature.
NEWTON SKILLMAN.